Feb. 5, 1957  A. G. SCHILBERG  2,779,965
BALL CASTER
Filed April 5, 1954
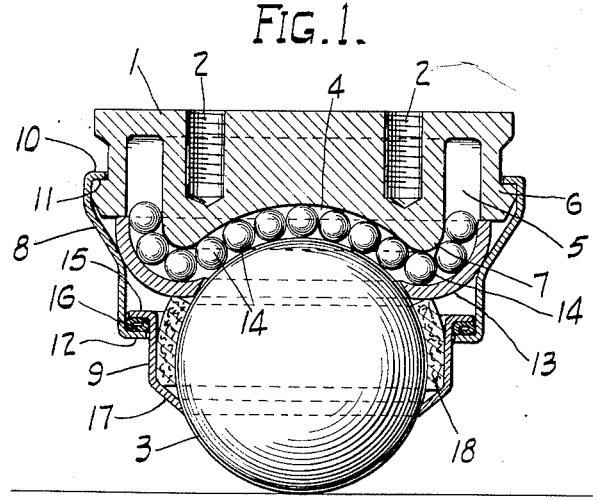
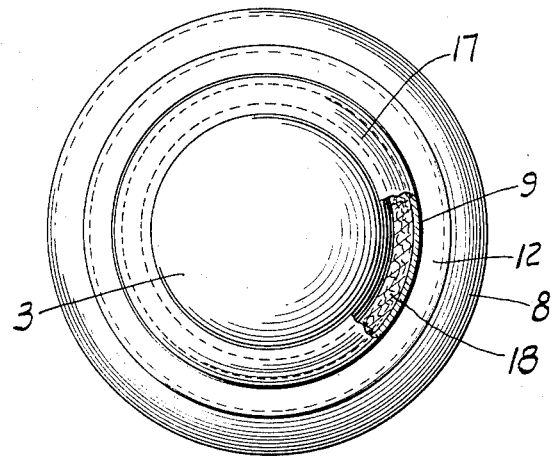
INVENTOR.
Arnold G. Schilberg
BY Andrus & Seeales
ATTORNEYS.

United States Patent Office 2,779,965
Patented Feb. 5, 1957

2,779,965

BALL CASTER

Arnold G. Schilberg, Milwaukee, Wis., assignor to A. O. Smith Corporation, Milwaukee, Wis., a corporation of New York Application April 5, 1954, Serial No. 421,065

5 Claims. (Cl. 16—26)

This invention relates to improvements in ball casters of the type used on industrial tote boxes and the like.

Experience has shown that known types of ball casters are short-lived because dirt and other foreign matter enters the caster structure causing the rolling elements and surfaces to become pitted and otherwise impairing the proper functioning of the caster. This invention is directed to overcoming this difficulty.

According to the invention, means are provided whereby dirt and other foreign matter are effectively prevented from entering the caster structure resulting in proper functioning of the caster over a substantially longer period of time.

More specifically according to the invention, the large supporting ball of a ball caster is mounted for universal rotation on ball bearings beneath a socket member which is secured to the article to be supported by the ball caster. The supporting ball is retained in position beneath the socket member by an annular scraper element disposed around the ball and which has an inwardly bent lower flange in contacting relation with the ball. An annular retainer ring is secured to the socket member and holds the scraper element in place with a resilient member being located between the scraper element and the retainer ring and urging the scraper element upwardly to maintain contact at all times between the scraper element and the supporting ball. An annular felt seal extends around the ball in contacting relation therewith and is supported above the lower flange of the scraper element. As the supporting ball rotates over a surface in any direction, the resiliently mounted scraper removes any large particles of dirt and foreign matter picked up on the surface of the ball while the felt seal picks up dust and smaller particles. The described structure is effective in substantially overcoming the deleterious effects of dirt and other foreign matter if they become lodged between the ball bearings and the supporting ball of the caster.

The drawing furnished herewith illustrates the best mode of carrying out the invention as presently contemplated and set forth hereinafter.

In the drawing:

Figure 1 is a vertical axial section of a ball caster showing the invention; and Fig. 2 is a bottom view of the ball caster with a portion broken away.

Referring to the drawings there is shown a ball caster comprising in general a relatively thick heavy duty socket member 1 having bolt holes 2 or the like for securing the caster to the leg or other part of an article, not shown, to be supported by the caster, and a generally large ball 3 suspended from socket member 1 and disposed for universal rotation on the surface on which the article is supported.

The socket member 1 is shown as generally circular in shape and has a flat upper face to fit securely against the article to be supported. The lower face of the socket member 1 is provided with a central concave socket 4. An annular groove 5 of substantial height is formed in the lower portion of member 1 leaving a depending flange 6 on the outer periphery of the socket member 1. The vertical inner surface of groove 5 merges with the concave socket 4 by means of the rounded surface 7 at their annular meeting edge.

The ball 3 is secured for rotation in all directions below socket member 1 by a retainer sleeve 8 and a scraper ring 9 depending therefrom. Sleeve 8 has an inturned flange 10 at its upper end to overlap a shoulder 11 on flange 6 of the socket member 1 and has an inwardly turned flange 12 at its lower end. The lower portion of sleeve 8 is reduced in diameter and a tapered shoulder at the midportion of the sleeve provides a support for a curved ring 13 which extends from ball 3 to the lower end of flange 6 and cooperates with socket 4 to provide a race for a plurality of ball bearings 14 which are disposed between large ball 3 and socket 4.

Flange 12 at the lower end of sleeve 8 supports the upper flange 15 of the scraper ring 9 through an annular resilient member 16 made of a material such as neoprene tubing. Scraper ring 9 extends downwardly from flange 15 as a tubular portion spaced from ball 3 and then as an inwardly turned conical flange 17 the lower edge of which engages ball 3 below a horizontal plane through the center of the ball. The scraper ring 9 is at all times urged upwardly into contact with the lower portion of ball 3 by the resilient member 16 and maintains this contact regardless of any uneven surfaces encountered by ball 3 or wear of the members due to service.

The lower flange 17 of scraper ring 9 also provides a support for an annular felt seal 18 which surrounds the supporting ball 3. The seal 18 is housed by the scraper ring 9 and extends between the flange 17 and the ball race ring 13 and contacts the ball around its entire circumference over a substantial area.

Upon rolling over a surface such as a floor, the supporting ball 3 will pick up dirt and other foreign matter. The resiliently mounted scraper engaging the supporting ball will remove all the larger particles picked up by the ball. The felt seal 18 will remove dust and other smaller particles which have passed the scraper. Protected in this manner the ball bearings are prevented from binding or wedging due to foreign inclusions and substantial pitting of the contacting surfaces is likewise prevented.

In operation of the device as the caster moves over a surface ball 3 rotates on ball bearings 14 and the ball bearings 14 tend to pile up in annular groove 5 ahead of ball 3. As the ball bearings pile up they seek a lower level and rotate around groove 5 to the rear or sides of ball 3 and there recirculate between the ball and socket to constantly replenish the bearing surface for ball 3.

The invention provides a ball caster in which the ball bearings and supporting ball are protected from pitting or other injury by a resiliently supported scraper for removing large foreign particles and a felt seal to remove dust and smaller particles.

Various modes of carrying out the invention are contemplated as within the scope of the following claims particularly pointing out and distinctly claiming the subject matter which is regarded as the invention.

I claim:

1. In a ball caster, a socket member having an annular shoulder, a supporting ball spaced beneath the socket member, a layer of recirculating ball bearings disposed between the supporting ball and socket member to provide a bearing surface for said supporting ball, means to retain said supporting ball beneath the socket member including an annular scraper ring disposed around the ball and supported from the shoulder on said socket member, and resilient means disposed between the shoulder on said socket member and the scraper ring to urge said ring upwardly into contact with the ball in a plane beneath the horizontal plane through the center of the ball to remove particles of foreign matter therefrom during operation of the caster.

2. In a ball caster wherein a plurality of ball bearings recirculate in a raceway provided between a supporting ball mounted for universal rotation over a floor and a socket member adapted for attachment to an object to be moved over the floor, an annular retaining element surrounding the supporting ball with the upper end thereof supported on the socket member and extending downwardly therefrom and having an annular inwardly directed flange on its lower extremity, an annular resilient member disposed on said flange, and an annular scraper ring disposed around the supporting ball in spaced relation therewith with a flange on the upper end seated on said resilient member and extending downwardly therefrom, and a lower flange on said scraper ring directed inwardly to engage the surface of the supporting ball on a plane beneath the horizontal plane through the center of the ball, said resilient member maintaining engagement between the scraper ring and the supporting ball over uneven surfaces encountered by the ball in service and compensating for wear in the caster elements.

3. In a ball caster wherein a plurality of ball bearings recirculate in a raceway provided between a supporting ball mounted for universal rotation over a floor and a socket member adapted for attachment to an object to be moved over the floor, an annular shoulder provided on the socket member, an annular retaining element having annular inwardly directed flanges on its upper and lower extremities with the upper flange disposed in engagement with the shoulder of said socket member, an annular resilient member disposed on the lower flange of the retaining element, an annular scraper ring formed with an outwardly extending upper flange to seat on the resilient member and an angular downwardly extending lower flange to bear against the surface of the supporting ball on a plane beneath the horizontal plane through the center of the ball, said resilient member serving to maintain the scraper ring in contact with the supporting ball at all times, and an annular seal disposed circumferentially of the supporting ball and in contacting relation therewith and supported on the lower flange of the scraper ring, said scraper ring and seal serving to remove particles of foreign matter from the supporting ball in service.

4. A ball caster comprising a ball adapted for universal rotation over a surface, a socket member spaced above the ball and having the underside thereof formed with a centrally circular concave surface concentric to the ball and having an annular channel outwardly from the concave surface with the inner channel wall and concave surface meeting at a rounded edge, a curved annular ball race element spaced from the rounded edge of the channel wall and concave surface and providing a continuation of the outer channel wall between the socket member and the ball, the said channel, ball race element, and spacing between the ball and the concave surface of the socket member defining a raceway, a plurality of recirculating ball bearings disposed in a single layer within the raceway, an annular outwardly extending shoulder provided on the socket member, a scraper ring spaced from the ball to provide a clearance therebetween for the greater extent of said ring and having an angularly downwardly extending flange contacting the ball on a plane beneath the horizontal plane through the center of the ball, a seal disposed around the ball in said clearance and supported by said flange, and resilient means supported from said shoulder and engaging the scraper ring to connect the scraper ring to the socket member and bias the flange upwardly into contact with the ball to confine the ball beneath the socket member.

5. A ball caster comprising a ball adapted for universal rotation over a surface, a socket member spaced above the ball and having the underside thereof formed with a circular concave surface concentric to the ball and an annular channel outwardly from the concave surface with the inner channel wall and concave surface meeting at a rounded edge, a curved annular ball race element spaced from the rounded edge of the channel wall and concave surface and providing a continuation of the outer channel wall between the socket member and the ball, the said channel, ball race element, and spacing between the ball and the concave surface of the socket member defining a raceway, a plurality of recirculating ball bearings disposed in a single layer within the raceway, an annular shoulder provided on the outer periphery of said socket member, an annular retaining ring flanged inwardly at the upper end to engage said shoulder and having an inwardly directed flange on the lower end thereof, said retaining ring being bent inwardly between the flanged ends to provide a seat for the ball race element, an annular resilient element disposed on the lower flange of the retaining ring, an annular scraper ring spaced from the ball and having an outwardly directed upper flange seated on said resilient element and a lower flange directed angularly downwardly to engage the ball surface on a plane below the horizontal plane through the center of the ball, said resilient element serving to compensate for wear in the caster elements and at all times maintain contact between the ball and scraper ring, and an annular felt seal disposed around the ball and in engagement therewith and supported by the lower flange of the scraper ring, said scraper ring and seal serving to clean the surface of the ball in service.

References Cited in the file of this patent

UNITED STATES PATENTS

| | | |
|---|---|---|
| 888,426 | Legge | May 19, 1908 |
| 1,440,641 | Stevens | Jan. 2, 1923 |
| 2,467,603 | Stewart | Apr. 19, 1949 |
| 2,495,599 | Pinnick | Jan. 24, 1950 |